(12) United States Patent
Fujiwara (10) Patent No.: US 7,044,693 B2
(45) Date of Patent: May 16, 2006

(54) MACHINE TOOL

(75) Inventor: Ryuichi Fujiwara, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 82 days.

(21) Appl. No.: 10/938,623

(22) Filed: Sep. 13, 2004

(65) Prior Publication Data

US 2005/0069392 A1 Mar. 31, 2005

(30) Foreign Application Priority Data

Sep. 30, 2003 (JP) ............................. 2003-339664

(51) Int. Cl.
*B23C 9/00* (2006.01)
*B23Q 11/00* (2006.01)

(52) U.S. Cl. .............. 409/137; 409/219; 29/DIG. 101; 269/13; 269/15

(58) Field of Classification Search ................ 409/137, 409/134–136, 219, 235; 29/DIG. 101; 269/13–15; 82/901, 149; 408/67–68, 234
See application file for complete search history.

(56) References Cited

U.S. PATENT DOCUMENTS

| | | | | |
|---|---|---|---|---|
| 1,096,588 A | * | 5/1914 | Baker et al. | 29/DIG. 101 |
| 1,426,496 A | * | 8/1922 | Norris | 269/296 |
| 1,740,185 A | * | 12/1929 | Linden et al. | 409/219 |
| 1,817,083 A | * | 8/1931 | Kearney et al. | 409/219 |
| 1,926,997 A | * | 9/1933 | Hoelscher et al. | 82/149 |
| 2,253,846 A | * | 8/1941 | Cornell | 409/134 |
| 2,386,461 A | * | 10/1945 | Hellman | 409/240 |
| 3,195,415 A | * | 7/1965 | Shorb | 409/219 |
| 3,770,110 A | * | 11/1973 | Boskovitch | 269/15 |
| 4,449,870 A | * | 5/1984 | Suzuki | 409/134 |
| 4,950,113 A | * | 8/1990 | Winkler et al. | 409/134 |
| 5,586,848 A | * | 12/1996 | Suwijn | 409/137 |
| 5,611,137 A | * | 3/1997 | Braun | 409/137 |
| 6,116,616 A | * | 9/2000 | Bratten | 29/DIG. 101 |
| 6,641,341 B1 | * | 11/2003 | Sato et al. | 409/137 |
| 2003/0021647 A1 | * | 1/2003 | Groitl et al. | 409/137 |

FOREIGN PATENT DOCUMENTS

| | | | |
|---|---|---|---|
| EP | 949044 A2 | * | 10/1999 |
| GB | 2095141 A | * | 9/1982 |
| JP | 55-112738 A | * | 8/1980 |
| JP | 57-149135 A | * | 9/1982 |
| JP | 5-26245 | | 4/1993 |
| JP | 6-71533 | | 3/1994 |
| JP | 8-57740 A | * | 3/1996 |
| JP | 8-267320 | | 10/1996 |
| JP | 9-309042 A | * | 12/1997 |
| JP | 10-94940 A | * | 4/1998 |

(Continued)

*Primary Examiner*—Erica Cadugan
(74) *Attorney, Agent, or Firm*—Armstrong, Kratz, Quintos, Hanson & Brooks, LLP (57) ABSTRACT

In a double housing machining center, a table having a plurality of T slots on its top surface is arranged substantially in a horizontal direction. A lower space, into which chips are received, is provided under the table. A plurality of through-holes, being in fluid communication with bottom portions of the T slots and passing through the table to reach the lower space, is scattered and formed in the table. The chips introduced into the T slots are discharged into the lower space through the through-holes. Thus, the chips splashed down onto the table and introduced into the T slots are readily removed and the cleaning work of the table is reduced.

15 Claims, 4 Drawing Sheets

FOREIGN PATENT DOCUMENTS

| | | |
|---|---|---|
| JP | 10-286734 | 10/1998 |
| JP | 11-99420 | 4/1999 |
| JP | 2002-103168 A * | 4/2002 |
| JP | 2002-326136 A * | 11/2002 |
| JP | 2003-25181 A * | 1/2003 |
| WO | WO-02/22273 A1 * | 3/2002 |

* cited by examiner

MACHINE TOOL

BACKGROUND OF THE INVENTION

1. Field of the Invention

The present invention relates to a machine tool such as a machining center (hereinafter referred to as MC) having a table, and more particularly to a machine tool which may readily remove chips splashed down onto the table and introduced into T slots of the like of the table.

2. Description of the Related Art

In an MC out of machine tools, in many cases, there is provided with a table arranged substantially in a horizontal direction. Normally, T slots are formed on a top surface of the table.

For example, a double housing MC (double housing machining center) having the table arranged substantially in the horizontal direction is disclosed in Japanese Utility Model Application Laid-Open No. 5-26245, Japanese Patent Application Laid-Open No. 6-71533, Japanese Patent Application Laid-Open No. 8-267320, Japanese Patent Application Laid-Open No. 10-286734, Japanese Patent Application Laid-Open No. 11-99420.

The above-described table is positioned in a machining area. Accordingly, chips and cutting fluid generated during machining would be splashed down onto the table and parts thereof would be introduced into the T slots. Because the cutting fluid flows to the outside from the T slots, there is no problem. However, most of the chips introduced into the T slots would not be discharged but remain therein so that the amount of chips within the T slots is increased as the machining is advanced.

In some cases, not only the top surface of the table but also the T slots should be cleaned up during setup work on the way of the operation of the MC or upon the completion of the operation. However, the T slots are narrow in width and long in the longitudinal direction. In addition, an inner lower portion of the T slot is wide in width. For this reason, it takes long time and much work to remove the chips introduced into the T slots. This causes some load in cleaning work.

SUMMARY OF THE INVENTION

Accordingly, in order to overcome the above-noted defects, an object of the present invention is to provide a machine tool in which chips, splashed down onto a table arranged substantially in a horizontal direction and introduced into T slots or the like of the table, are readily removed to thereby make it possible to reduce cleaning work of the table.

In order to attain this object, according to the present invention, there is provided a machine tool having a table substantially in a horizontal direction, wherein a lower space into which chips are received is provided under the table and the chips are discharged into the lower space.

Preferably, the table has a plurality of T slots formed on its top surface, a plurality of through-holes, which is in fluid communication with bottom portions of the T slots and passes through the table to reach the lower space, is formed in the table and is arranged to be scattered on the table, and the chips introduced into the T slots are discharged into the lower space through the through-holes.

Preferably, with respect to a Y-axis direction perpendicular to a longitudinal X-axis direction of the T slots in the horizontal direction, a width dimension of an upper opening portion of the through-hole is smaller than an inner dimension of an expanded portion of the T slots and a width dimension of a lower opening portion of the through-hole, which is formed into a predetermined shape, is larger than the width dimension of the upper opening portion.

Preferably, the through-holes out of the plurality of through-holes, being in fluid communication with the T slots located outside of the lower space in top plan view, are adapted to be bent or curved within the table and are in fluid communication with the lower space.

Preferably, the machine tool has outer collecting plates which collects the chips falling from outer circumferential edges of the table to the outside, and slant passages are formed in the table, the slant passages are the passages for causing the chips, received on the outer collecting plates, to pass into the lower space, the slant passage are opened on outer circumferential surfaces of the table and are slanted downwardly from the outer circumferential surfaces and are in fluid communication with a back surface of the table.

Preferably, the machine tool has outer collecting plates which collect the chips falling down from outer circumferential edges of the table to the outside, and slant passages for causing the chips, received on the outer collecting plates, to pass into the lower space are formed in the table.

Preferably, lower collecting plates are arranged in the lower space, and the lower collecting plates guide the chips, discharged from the through-holes and the slant passages respectively, onto a chip discharging means arranged in the lower space.

Preferably, a pair of lower collecting plates is mounted on the back surface of the table or on a bed and is arranged to extend in the X-axis direction, the chips received in the lower space are discharged to the outside of a machine body by the chip discharging means, and the lower collecting plates exhibit a function to shield X-axis guide rails and screw shafts of the X-axis ball screws from the lower space.

Preferably, the lower space is provided to extend longitudinally in an X-axis direction in a lower middle portion of the table, and a pair of X-axes guide rails and screw shafts of a pair of X-axes ball screws are arranged in predetermined positions out of the lower space to the outside, respectively.

In the machine tool according to the present invention, chips splashed down onto the table arranged substantially in a horizontal direction and introduced into T slots or the like of the table may readily be removed to thereby make it possible to reduce cleaning work of a table.

BRIEF DESCRIPTION OF THE DRAWINGS

FIGS. 1 to 4 show one embodiment of the present invention.

MODE OF EMBODYING THE INVENTION

In a machine tool according to the present invention, a table having a plurality of T slots on its top surface (or having no T slots) is arranged substantially in a horizontal direction. A lower space into which chips may be received is provided under the table of the machine tool. As such a machine tool, the following embodiment shows a double housing MC (double housing machining center) out of MCs.

According to the invention, an object to remove the chips introduced into the T slots or the like of the table is attained by a simple structure in which a plurality of through-holes, which are in fluid communication with bottom portions of the T slots and pass through the table to reach the lower space, is scattered and formed in the table.

Also, an object of the present invention is to cause the chips remaining on the table to pass to the lower space after scavenging the chips from outer circumferential edges of the table to the outside, thereby completing the cleaning work of the table. Outer collecting plates which may collect the chips are provided and slant passages, which are opened on outer circumferential side surfaces of the table and are slanted from the outer circumferential side surfaces to the lower side and are in fluid communication with a back surface of the table, are formed in the table to thereby attain this object.

The machine tool, to which the present invention is applied, may be a normal MC other than the double housing MC. An axis of a main spindle of the normal MC may be either substantially in a vertical direction to the floor surface or in a horizontal direction to the floor surface.

In the present invention, the table of the machine tool may be movable or unmovable. The cases, in which the table is arranged in the horizontal direction or is slanted slightly to the horizontal direction, are regarded as the case in which "the table is arranged substantially in the horizontal direction".

DESCRIPTION OF THE PREFERRED EMBODIMENTS

One embodiment of the present invention will now be described with reference to FIGS. 1 to 4.

Figure 1:
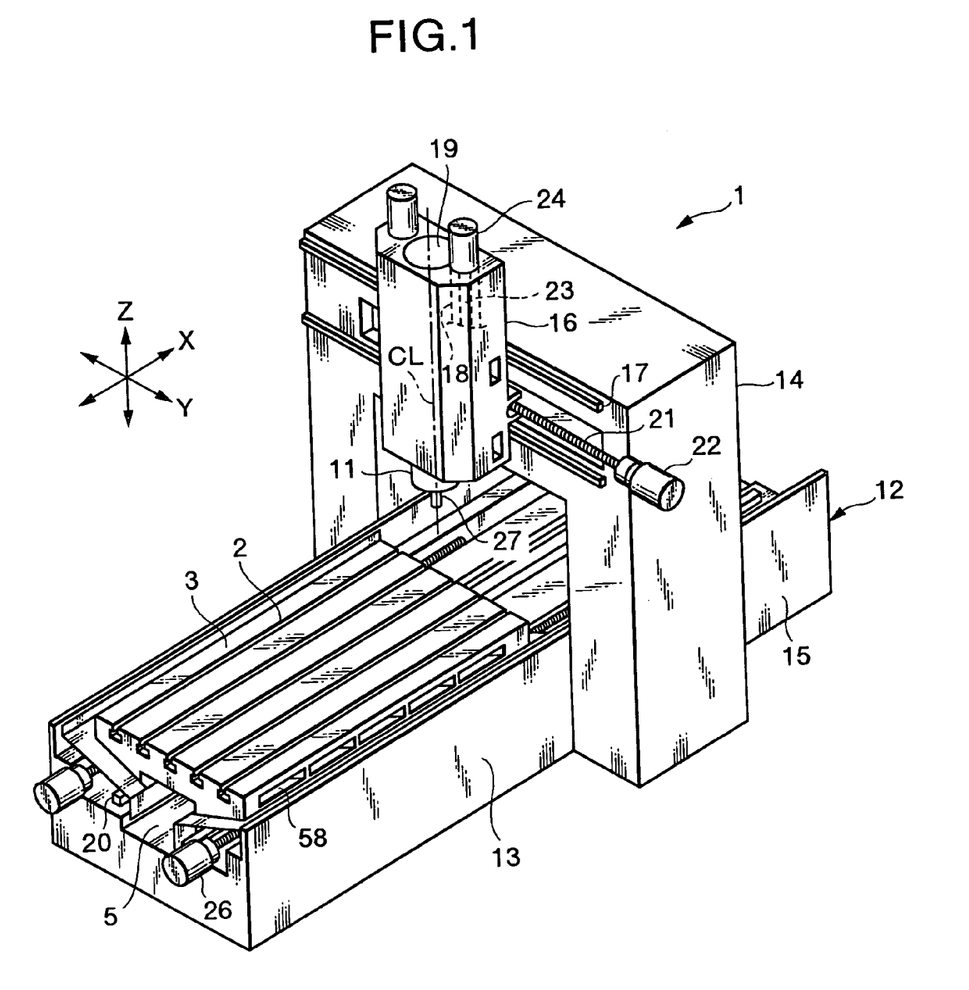
FIG. 1 is a perspective view of a double housing machining center.
Figure 2:
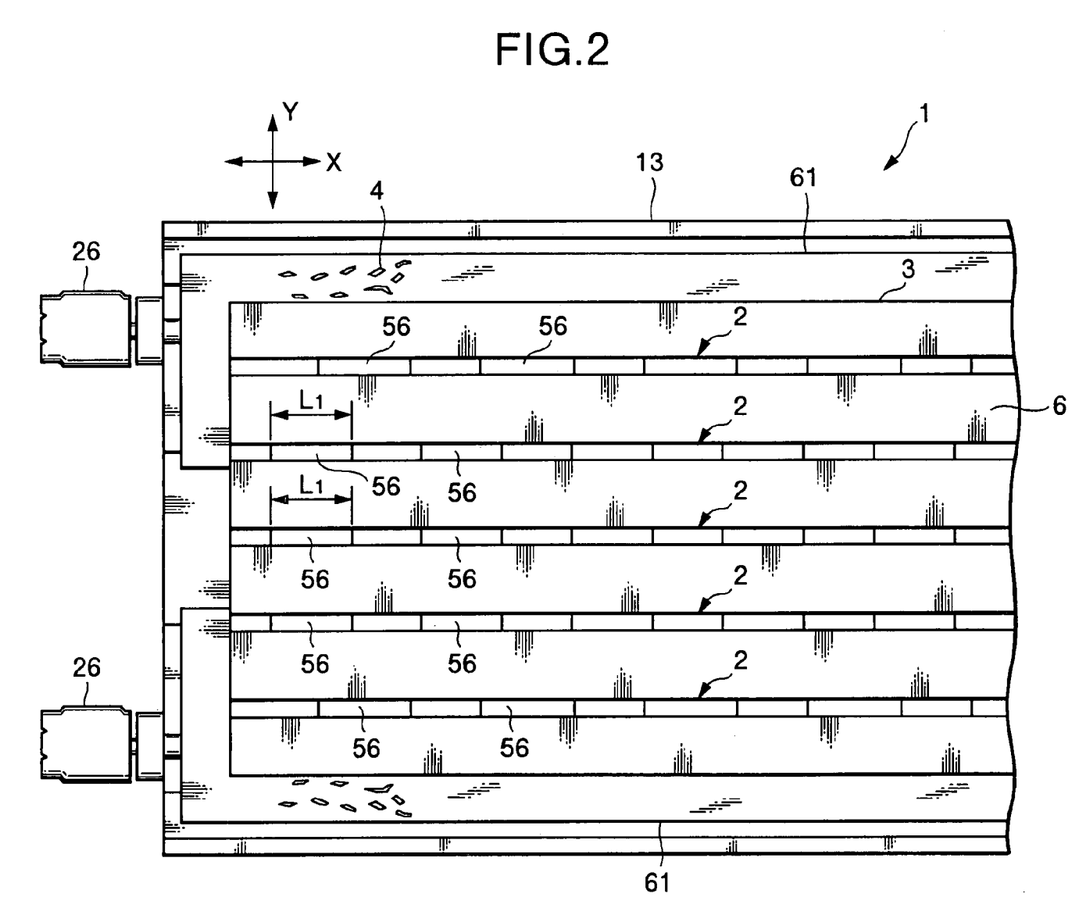
FIG. 2 is a partial top plan view of an area of a table of the double housing machining center.
Figure 3:
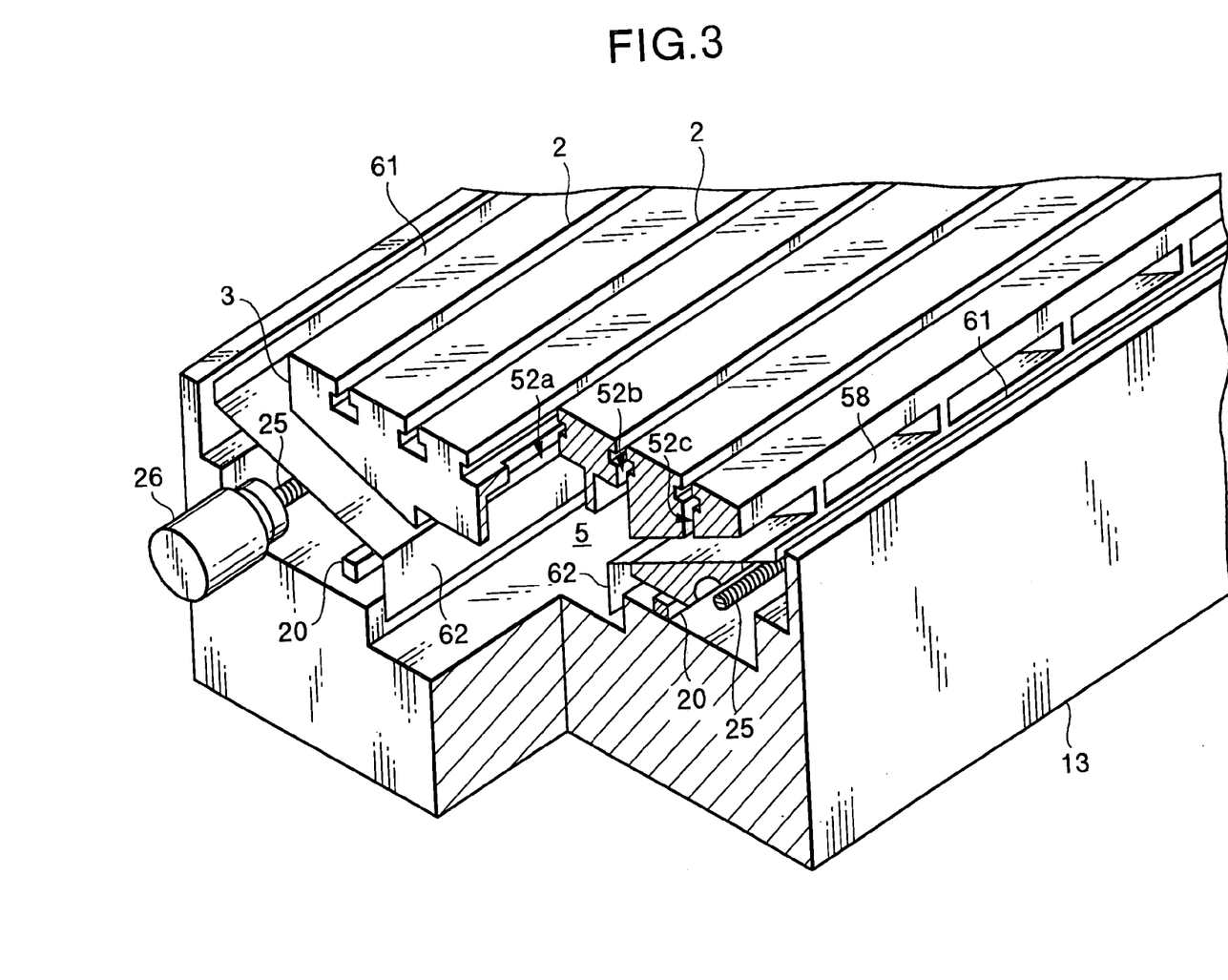
FIG. 3 is a partial enlarged perspective view of the area of the table of the double housing machining center.
Figure 4:
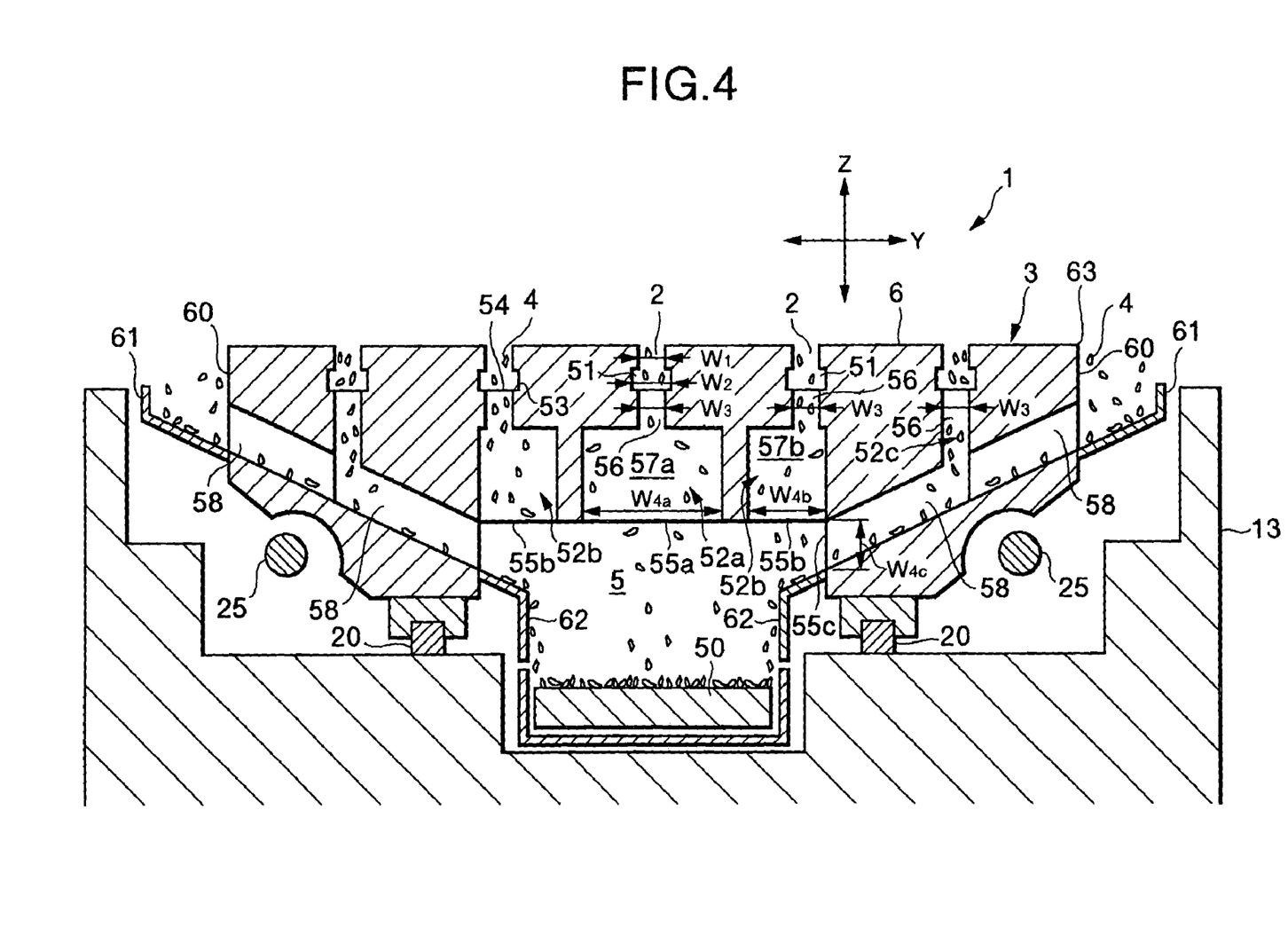
FIG. 4 is a partial cross-sectional view of the area of the table of the double housing machining center.

FIGS. 1 to 4 show one embodiment of the present invention. FIG. 1 is a perspective view of a double housing MC. FIGS. 2, 3 and 4 are a partial top plan view, a partial enlarged perspective view and a partial cross-sectional view of an area of a table of the double housing MC shown in FIG. 1, respectively.

As shown in FIGS. 1 to 4, a table 3 is arranged substantially in a horizontal direction in the double housing machining center 1 (hereinafter referred to as MC 1) as a machine tool. The table 3 has a plurality of parallel T slots 2 formed on its top surface 6. A lower space 5 into which chips 4 may be received is provided under the table 3. The MC 1 may machine and cut large size workpieces such as aluminum alloy large size parts and wood large side parts.

The MC 1 is provided with a machine body 12 having a spindle head 11 provided with a main spindle, a tool magazine (not shown), an automatic tool changer (ATC) (not shown) and the like. The MC 1 is also provided with an automatic pallet changer (APC) (not shown) for automatically changing pallets on which workpieces are placed. The MC 1 is controlled by a controller having an NC (numerical control) unit and a PLC (programmable logic controller).

A bed 13 and a double housing column 14 of the MC 1 are placed on a floor surface to form a base 15 of the machine body 12. The column 14 is adapted to straddle the bed 13 and is arranged in a direction perpendicular to the bed 13.

An axis CL of the main spindle is directed in the vertical direction to the floor surface. The spindle head 11 for rotatably supporting the main spindle is movable in a three mutually transverse axes directions (X-axis direction, Y-axis direction and Z-axis direction) relative to the workpiece on the table 3. In the MC 1, an axial direction in parallel with the axis CL of the main spindle is regarded as the Z-direction. The respective axial directions perpendicular to the Z-direction to form a transverse coordinate system are regarded as the X-axis and the Y-axis.

On the column 14, a saddle 16 is provided to be movable in the Y-axis direction while being guided by a pair of parallel Y-axis guide rails 17. The spindle head 11 is provided on the saddle 16. The spindle head 11 is movable, relative to the saddle 16, in the Z-axis direction (up-and-down direction) in parallel with the axis CL of the main spindle.

The spindle head 11 is movable while being guided by a pair of parallel Z-axis plain bearing slideways 18 provided in the saddle 16. The spindle head 11 is in engagement with an engagement hole 19, which is formed through the saddle 16 in the Z-axis direction, and is movable in the Z-axis direction. The pair of Z-axis plain bearing slideways 18 has a rotation preventing function so that the spindle head 11 engaging with the engagement hole 19 is not rotated around the axis CL.

The table 3 is supported on the bed 13 and is arranged below a height level position of the spindle head 11. The table 3 is movable in the X-axis direction along and on the bed 13 while being guided by a pair of parallel X-axis guide rails 20.

A pair of Y-axis guide rails 17 is mounted on the column 14. A screw shaft 21 of the Y-axis ball screw is arranged in parallel with the Y-axis guide rails 17 between the pair of Y-axis guide rails 17. A ball nut fixed to the saddle 16 is screwed on the screw shaft 21.

A Y-axis servomotor 22 is mounted on the column 14. The Y-axis servomotor 22 drivingly rotates the screw shaft 21 in forward and reverse directions. When the screw shaft 21 is driven by the Y-axis servomotor 22, the screw shaft 21 is rotated. Then, the saddle 16 on which the ball nut is fixed is moved to-and-fro in the Y-axis direction while being guided by the pair of Y-axis guide rails 17.

The pair of Z-axis plain bearing slideways 18 is provided on the saddle 16. A screw shaft 23 for Z-axis ball screw is arranged in parallel with each Z-axis plain bearing slideway 18 inside of each Z-axis plain bearing slideway 18. For example, there is the case in which the screw shaft 23 is arranged coaxially with the Z-axis plain bearing slideway 18 or there is the case in which the Z-axis plain bearing slideway 18 is formed like a shape of a rail or a rectangular shape formed by plain surfaces in combination.

A ball nut fixed to the spindle head 11 is screwed with the screw shaft 23. A pair of Z-axis servomotors 24 is mounted on the saddle 16. Each Z-axis servomotor 24 drivingly rotates the screw shaft 23 in the forward and reverse directions.

The screw shaft 23 is rotated when the screw shaft 23 is driven by the Z-axis servomotor 24. Then, the spindle head 11 to which the ball nut is fixed is guided and supported by the engagement hole 19 and the pair of Z-axis plain bearing slideways 18 to be moved to-and-fro in the Z-axis direction.

The pair of X-axis guide rails 20 is mounted on the bed 13. In the vicinity of each X-axis guide rail 20, a screw shaft 25 of an X-axis ball screw is arranged in parallel with the X-axis guide rails 20.

A ball nut fixed to the table 3 is screwed with the screw shaft 25 directed in the X-axis direction. A pair of X-axis servomotors 26 is mounted on the bed 13. Each X-axis servomotor 26 drivingly rotates the screw shaft 25 in the forward and reverse directions.

The screw shaft 25 is rotated when the screw shaft 25 is driven by the X-axis servomotor 26. Then, the table 3 on which the ball nut is fixed is guided and supported by the pair of X-axis guide rails 20 to be moved to-and-fro in the X-axis direction.

A built-in type main spindle motor is built in the interior of the spindle head 11. The main spindle supported rotatably to the spindle head 11 is drivingly rotated at predetermined rotational speeds by the main spindle motor. A tool 27 is detachably mounted onto the main spindle.

Under the condition in which the workpiece is mounted through a pallet (or directly) on the table 3, the main spindle is rotated at the predetermined speeds. Then, the workpiece on the table 3 is machined and cut by the tool 27 mounted on the main spindle.

The spindle head 11 is movable in the Y-axis direction and the Z-axis direction. The table 3 is movable in the X-axis direction. Accordingly, the spindle head 11 is moved in the three mutually transverse axes directions relative to the workpiece on the table 3. Thus, the MC 1 may machine the workpiece under the three axes control of the X-axis, Y-axis and Z-axis.

A splash guard is provided on the MC 1. This splash guard prevents the chips and the cutting fluid within the machining area from splashing to the outside of the machining area when the workpiece is machined in the machining area by the tool 27.

The structure of the area of the table 3 will now be described.

A plurality of T slots 2 in parallel with each other is formed to extend longitudinally in the X-axis direction on the top surface 6 of the table 3. A cross-sectional shape of each T slot 2 is such that a width dimension W1 of its upper portion is narrow and a width dimension W2 of a lower expanded portion 51 is wide.

The lower space 5 is provided to extend longitudinally in the X-axis direction in a lower middle portion of the table 3. The pair of X-axes guide rails 20 and the screw shafts 25 of the pair of X-axes ball screws are arranged in predetermined positions out of the lower space 5 to the outside, respectively.

A chip conveyor 50 used as a chip discharging means is provided in the lower portion within the lower space 5. The chip conveyor 50 is adapted to discharge the chips 4, received in the lower space 5, to the outside of the machine body 12.

A plurality of through-holes 52a, 52b and 52c is formed in the table 3. These plural through-holes 52a, 52b and 52c are arranged to be scattered on the table 3. For example, in the central T slot 2, a plurality of through-holes 52a is separated from each other and is arranged regularly. In the two T slots 2 on the both outer sides of the central T slot 2, a plurality of through-holes 52b is separated from each other and is arranged regularly. In the two T slots 2 on the both further outer sides of those T slots 2, a plurality of through-holes 52c is separated from each other and is arranged regularly.

The through-holes 52a, 52b and 52c are in fluid communication with bottom portions 53 of the T slots 2 formed on the table 3 and pass through the table 3 to reach the lower space 5. Thus, the chips 4 introduced into the T slots 2 may be discharged into the lower space 5 through the through-holes 52a, 52b and 52c.

The each upper side of the through-holes 52a, 52b and 52c is opened to the interior of the T slots 2. In the cleaning work, a rod or the like is inserted from the T slot 2 to the through-holes 52a, 52b and 52c to downward push the chips 4 in the T slot 2.

The, the chips 4 may be pushed toward the lower space 5 through the through-holes 52a, 52b and 52c. Thus, the chips 4 splashed down onto the table 3 and introduced into the T slots 2 may readily be removed to thereby reduce the cleaning work of the table 3.

With respect to the direction (Y-axis direction) perpendicular to the longitudinal direction (X-axis direction) of the T slots 2 in the horizontal direction, the width dimension W3 of the upper opening portion 54 of each through-hole 52a, 52b, 52c is smaller than the inner dimension W2 of the expanded portion 51 of the T slot 2. Accordingly, a head portion of a T-slot bolt (or T-slot nut) is well engaged with the T slot 2 without falling apart down to the through-hole 52a, 52b and 52c.

Also, with respect to the Y-axis direction, the width dimensions W4a, W4b (the up-and-down dimension W4c of a lower opening 55c of the through-hole 52c) of lower opening portions 55a, 55b, 55c of the through-holes 52a, 52b, 52c are formed into predetermined shapes larger than the width dimension W3 of the upper opening portion 54. Thus, when the chips 4 within the T slots 2 are introduced into the through-holes 52a, 52b and 52c, the chips 4 are not compressed in the through-holes 52a, 52b and 52c but may readily be moved downwardly to fall down into the lower space 5.

The through-holes 52a and 52b in this embodiment are formed such that lower sleeve portions 57a, 57b having a larger cross-sectional area are in fluid communication with upper sleeve portions 56 having a smaller cross-sectional area and stepped portion is formed between the lower sleeve portion 57a, 57b and the upper sleeve portion 56. For example, the through-hole 52a of the central T slot 2 is composed of the upper sleeve portion 56, in fluid communication with the T slot 2 and having the width dimension W3 and the length dimension L1, and the lower sleeve portion 57a located below the upper sleeve portion 56. The lower sleeve portion 57a is arranged in fluid communication with the upper sleeve portion 56 and the lower space 5 and has a width dimension W4a and a predetermined dimension longer than the length dimension L1.

The through-hole 52b of the two T slots 2 located on both sides of the central T slot 2 is composed of an upper sleeve portion 56a, in fluid communication with the T slot 2 and having a width dimension W3 and a length dimension L1, and a lower sleeve portion 57b located below the upper sleeve portion 56a. The lower sleeve portion 57b is arranged in fluid communication with the upper sleeve portion 56a and the lower space 5 and has a width dimension W4b and a predetermined dimension longer than the length dimension L1.

The through-holes 52c out of the plurality of through-holes 52a, 52b and 52c are in fluid communication with the T slots 2 located outside of the lower space 5 in top plan view. The through-holes 52c are adapted to be bent or curved (curved in this embodiment) within the table 3 and are in fluid communication with the lower space 5. The through-holes 52c are composed of the upper sleeve portion 56 and a slant passage 58 slanted downwardly to be in fluid communication with the upper sleeve portion 56 and the lower space 5.

Thus, even if the T slots 2 are located outside the lower space 5 in top plan view, the chips 4 introduced into the T slots 2 are introduced into the lower space 5 through the through-hole 52c and are received in the lower space 5.

Incidentally, the through-holes 52a, 52b and 52c may have a shape having such a slant surface that cross-sectional area of the through-hole is increased downwardly.

The MC 1 has a pair of outer collecting plates 61 which may collect the chips 4 falling down from outer circumferential edges 63 of the table 3 to the outside. The pair of outer collecting plates 61 extends in the X-axis direction along outer circumferential edges 63 on both sides and is mounted on both sides of the table 3. Incidentally, the outer collecting plates 61 may be mounted on the bed 13.

The slant passages 58 are formed in the table 3. The slant passages 58 are the passages for causing the chips 4, received on the outer collecting plates 61, to pass into the lower space 5. The slant passages 58 are opened on outer circumferential surfaces 60 of the table 3 and are slanted downwardly from the outer circumferential surfaces 60 and are in fluid communication with a back surface (a surface on the side of the lower space 5) of the table 3.

A first side of each slant passage 58 is opened to the outer circumferential surface 60 of the table 3. In the cleaning work, a rod or the like is inserted from the opening portion of the outer circumferential surface 60 into the slant passage 58 so that the chips 4 in the slant passage 58 may be pushed down toward the lower space 5.

The slant passages 58 are arranged in a plural form in the X-axis direction and are formed symmetrical in the Y-axis direction. In this embodiment, a part of the slant passage 58 being in fluid communication with the outer collecting plate 61 serves also as a part of the through-hole 52*c*.

The chips 4 falling down from the outer circumferential edge 63 of the table 3 in machining or cleaning work are received on the outer collecting plates 61 and thereafter are received into the lower space 5 through the slant passages 58. In cleaning work, it is sufficient to scavenge the chips 4, remaining on the table 3, from the outer circumferential edges 63 to the outside and to cause the chips 4 to fall down onto the outer collecting plates 61. As a result, the cleaning work of the table 3 is facilitated, and at the same time, the outer circumference of the table 3 would not be contaminated by the chips 4 so that the MC 1 may be kept clean at all times.

Incidentally, this embodiment shows the case in which the table 3 has the plurality of T slots 2. However, it is a matter of course in which no T slots are formed on the table of a machine tool. Namely, the machine tool is constructed such that no T slots are formed on the top surface of the table, and the table is arranged substantially in the horizontal direction, and a lower space into which the chips may be received is formed under the table.

Even in such machine tool, it is preferable to provide outer collecting plates which may collect the chips falling from the outer circumferential edges of the table to the outside. Also, it is preferable that slant passages are formed in the table. The slant passages are opened on the outer circumferential surface of the table and are slanted downwardly from the outer circumferential surface in fluid communication with the back surface of the table in order to cause the chips, received on the outer collecting plates, to pass into the lower space.

Thus, in also cleaning work of such a machine tool, it is sufficient to scavenge the chips, remaining on the table, from the outer circumferential edge of the table to the outside and to cause the chips to fall down onto the outer collecting plates. Accordingly, it is possible to facilitate the cleaning work and to keep the machine tool clean to ensure the same effect as that of the foregoing embodiment.

In the MC1 (or in the above-described machine tool having no T slots on the table), lower collecting plates 62 are arranged in the lower space 5. The lower collecting plates 62 exhibit a function to guide the chips 4, discharged from the through-holes 52*a*, 52*b*, 52*c* and the slant passages 58 respectively, onto the chip conveyor (chip discharging means) 50 arranged in the lower space 5.

A pair of lower collecting plate 62 is mounted on the back surface of the table 3 (or on the bed 13) and is arranged to extend in the X-axis direction. The chips 4 received in the lower space 5 are discharged to the outside of the machine body 12 by the chip conveyor 50.

The lower collecting plates 62 exhibit the function to shield the X-axis guide rails 20, the screw shafts 25 of the X-axis ball screws and the like from the lower space 5. As a result, there is no fear that the chips 4 and the cutting fluid received in the lower space 5 would be directly entrained to the X-axis guide rails 20 and the screw shafts 25. Thus, the moving motion of the table 3 and the rotational motion of the screw shafts 25 may be performed smoothly.

As described above, the through-holes 52*a*, 52*b* and 52*c* are provided in the table 3, and the outer collecting plates 61 and the lower collecting plates 62 are further provided on the table 3. Accordingly, the chips 4 introduced into the T slots 2, out of the chips 4 splashed down onto the table 3, are received in the lower space 5 through the through-holes 52*a*, 52*b* and 52*c*. As a result, the removal of the chips 4 introduced into the T slots 2 is facilitated.

If the chips 4 on the table 3 are scavenged from the outer circumferential edge 63 to the outside, the chips 4 are collected by the outer collecting plates 61 and are received in the lower space 5 through the slant passages 58. As a result, since the chips 4 may readily be removed from the table 3, the cleaning work of the table 3 is reduced.

The slant passages 58 and the through-holes 52*a*, 52*b* and 52*c* are formed in the table 3. Thus, it is possible to reduce the weight of the table 3 without decreasing too much the strength of the table 3 per se.

The present invention may be applied also to a normal vertical MC and a horizontal MC other than the above-described double housing MC.

One embodiment (including the modification) of the present invention has been described above. However, the present invention is not limited to the specific embodiment but may be changed, modified or added within the scope of the essence of the invention.

Incidentally, the same reference numerals are used to indicate the corresponding parts or components.

What is claimed is:

1. A machine tool having a table substantially in a horizontal direction,
    wherein a lower space into which chips are received is provided under the table, and the chips are discharged into the lower space,
    wherein the table has a plurality of T slots formed on its top surface,
    a plurality of through-holes, which is in fluid communication with bottom portions of the T slots and passes through the table to reach the lower space, is formed in the table and is arranged to be scattered on the table,
    the chips introduced into the T slots are discharged into the lower space through the through-holes, and
    wherein, with respect to a Y-axis direction perpendicular to a longitudinal X-axis direction of the T slots in the horizontal direction, a width dimension of a lower opening portion of at least one of the through-holes, which is formed into a predetermined shape, is larger than a width dimension of an upper opening portion of the at least one through-hole.

2. The machine tool according to claim 1,
wherein, with respect to the Y-axis direction perpendicular to the longitudinal X-axis direction of the T slots in the horizontal direction,
the width dimension of the upper opening portion of the through-holes is smaller than an inner dimension of an expanded portion of the T slots.

3. The machine tool according to claim 1,
wherein the plurality of through-holes includes through-holes that are located outside of the lower space in top plan view, which are adapted to be bent or curved within the table and are in fluid communication with the lower space.

4. The machine tool according to claim 1,
wherein the machine tool has outer collecting plates which collect chips falling from outer circumferential edges of the table to the outside, and
slant passages are formed in the table, the slant passages cause the chips received on the outer collecting plates to pass into the lower space, the slant passages are opened on outer circumferential surfaces of the table and are slanted downwardly from the outer circumferential surfaces and are in fluid communication with a back surface of the table.

5. The machine tool according to claim 1,
wherein the machine tool has outer collecting plates which collect chips falling down from outer circumferential edges of the table to the outside, and
slant passages, for causing the chips received on the outer collecting plates to pass into the lower space, are formed in the table.

6. The machine tool according to claim 5,
wherein lower collecting plates are arranged in the lower space, and the lower collecting plates guide the chips, discharged from the through-holes and the slant passages respectively, onto a chip discharging means arranged in the lower space.

7. The machine tool according to claim 6,
wherein a pair of the lower collecting plates is mounted on the back surface of the table or on a bed and is arranged to extend in the X-axis direction,
the chips received in the lower space are discharged to the outside of a machine body by the chip discharging means, and
the lower collecting plates exhibit a function to shield X-axis guide rails and screw shafts of X-axis ball screws from the lower space.

8. The machine tool according to claim 1,
wherein the lower space is provided to extend longitudinally in an X-axis direction in a lower middle portion of the table, and
a pair of X-axes guide rails and screw shafts of a pair of X-axes ball screws are arranged in predetermined positions out of the lower space to the outside, respectively.

9. A machine tool having a table substantially in a horizontal direction,
wherein a lower space into which chips are received is provided under the table, and the chips are discharged into the lower space;
wherein the table has a plurality of T slots formed on its top surface,
a plurality of through-holes, which is in fluid communication with bottom portions of the T slots and passes through the table to reach the lower space, is formed in the table and is arranged to be scattered on the table,
the chips introduced into the T slots are discharged into the lower space through the through-holes, and
wherein the plurality of through-holes includes through-holes located outside of the lower space in top plan view, which are adapted to be bent or curved within the table and are in fluid communication with the lower space.

10. The machine tool according to claim 9,
wherein, with respect to a Y-axis direction perpendicular to a longitudinal X-axis direction of the T slots in the horizontal direction,
a width dimension of an upper opening portion of the through-holes is smaller than an inner dimension of an expanded portion of the T slots and
a width dimension of a lower opening portion of the through-holes, which is formed into a predetermined shape, is larger than the width dimension of the upper opening portion.

11. The machine tool according to claim 9,
wherein the machine tool has outer collecting plates which collect chips falling from outer circumferential edges of the table to the outside, and
slant passages are formed in the table, the slant passages cause the chips received on the outer collecting plates to pass into the lower space, the slant passages are opened on outer circumferential surfaces of the table and are slanted downwardly from the outer circumferential surfaces and are in fluid communication with a back surface of the table.

12. The machine tool according to claim 9,
wherein the machine tool has outer collecting plates which collect chips falling down from outer circumferential edges of the table to the outside, and
slant passages, for causing the chips received on the outer collecting plates to pass into the lower space, are formed in the table.

13. The machine tool according to claim 12,
wherein lower collecting plates are arranged in the lower space, and the lower collecting plates guide the chips, discharged from the through-holes and the slant passages respectively, onto a chip discharging means arranged in the lower space.

14. The machine tool according to claim 13,
wherein a pair of the lower collecting plates is mounted on the back surface of the table or on a bed and is arranged to extend in the X-axis direction,
the chips received in the lower space are discharged to the outside of a machine body by the chip discharging means, and
the lower collecting plates exhibit a function to shield X-axis guide rails and screw shafts of X-axis ball screws from the lower space.

15. The machine tool according to claim 9,
wherein the lower space is provided to extend longitudinally in an X-axis direction in a lower middle portion of the table, and
a pair of X-axes guide rails and screw shafts of a pair of X-axes ball screws are arranged in predetermined positions out of the lower space to the outside, respectively.

* * * * *